United States Patent [19]
Kern et al.

[11] 3,981,834
[45] Sept. 21, 1976

[54] CONCRETE TREATING COMPOSITION

[76] Inventors: Larry J. Kern, 1848 S. Stuart, Denver, Colo. 80219; John D. Webb, 2972 S. Vrain, Denver, Colo. 80236

[22] Filed: Dec. 30, 1974

[21] Appl. No.: 537,335

[52] U.S. Cl. ............................. 260/17 R; 106/12; 106/170; 106/171; 106/191; 106/193 J; 106/243; 260/23.7 A; 260/23.7 C; 260/29.7 GP; 260/29.7 N; 260/29.7 EM; 260/42.55

[51] Int. Cl.² ........................................ C08L 1/26

[58] Field of Search ............. 106/12, 170, 171, 178, 106/193 J, 300, 191, 243; 260/23.7 R, 29.6 XA, 17 R, 23 EM, 23.7 A, 23.7 C, 29.7 GP, 29.7 N, 29.7 EM, 42.55; 264/333

[56] References Cited
UNITED STATES PATENTS

| | | | |
|---|---|---|---|
| 2,976,163 | 3/1961 | Bitting et al. | 106/170 |
| 3,189,469 | 6/1965 | Littler et al. | 106/12 |
| 3,255,500 | 6/1966 | Engel et al. | 106/38.7 |

*Primary Examiner*—Lorenzo B. Hayes

[57] ABSTRACT

A curing composition for green concrete in the form of a water base emulsion exemplified by a composition comprising a film forming resin illustrated by a polydicyclopentadiene, stearic acid as an emulsifying agent, xylene as a solvent for the resin and stearic acid, a non-ionic surfactant to aid in film forming and water clean up, hydroxybutyl methocellulose as a thixotropic agent, water as the carrier medium, ammonia to aid in emulsification, and optionally, titanium dioxide as a pigment. The invention includes the process for making the composition and for treating concrete with the composition.

14 Claims, 1 Drawing Figure

LJ-13 RESIN EMULSION MOISTURE RETENTION PERFORMANCE VS. THAT OF A TYPICAL SOLVENT-BASED RESIN CURE

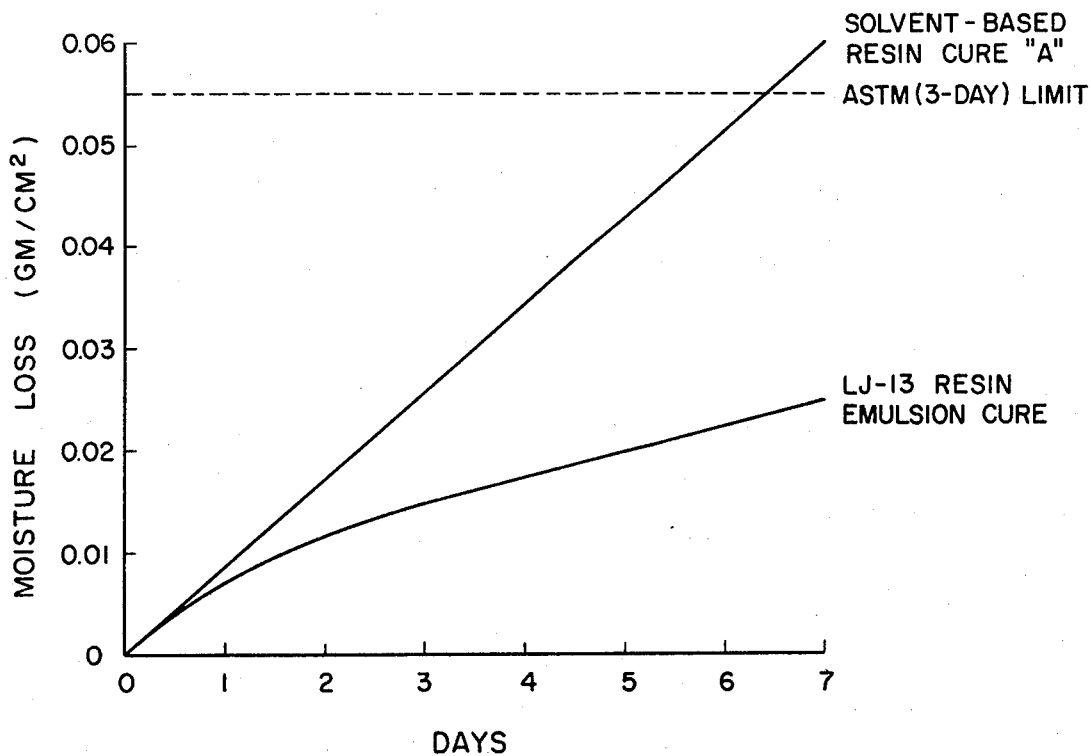

CONCRETE TREATING COMPOSITION

BACKGROUND OF THE INVENTION

The invention is in the field of additives for fresh or green concrete for controlling the quality of the finished concrete.

There are a large number of additives for fresh concrete on the market designed to achieve desired properties of the set concrete. For example, these additivs include those for entraining air in the concrete, reducing its water content, retarding set, preventing spalling, curing, sealing, hardening, etc. Obviously, the most desirable additives are those which provide the largest number of desired results. The present invention is specifically related to a composition for treating concrete which acts as a curing, hardening, anti-spalling agent.

The chief function of the curing agent is to form a tough water insoluble film over the concrete for retaining sufficient moisture therein to provide a high quality final product. Preferably, the seal should be impervious to mild acids, alkalis, grease, oil, water and de-icing salts. It should provide protection against sudden rain showers. It should serve to minimize hair cracking and spalling of horizontal and vertical concrete surfaces in both interior and exterior exposures. Obviously, if it serves to control the curing and hardening of the concrete along with its other functions this is desirable. Preferably, it wears off when exposed to the elements to allow for applications of paint and tile adhesives. Emission of toxic fumes should be in compliance with federal and state anti-pollution requirements.

Curing and sealing agents for green concrete in the past have ordinarily been solvent based compositions and the solvents used may increase the flammability of the compositions and as the cement dries the solvents result in pollutants being given off to the atmosphere. Another disadvantage of the organic solvent based compositions is that the solvents are derived from petroleum sources so that use of these compositions is another source of depletion of petroleum resources.

The ingredients of the composition of the present invention are selected and compounded to produce a final product which is a water base emulsion so that substantial use of organic solvents with their attendant disadvantages enumerated above is eliminated.

SUMMARY OF THE INVENTION

The green concrete treating composition of the present invention is a water base emulsion made by compounding the following components or ingredients: A film forming resin comprising a polycycloolefin, a fatty acid as an emulsifying agent, a solvent for the fatty acid, a non-ionic surfactant, a thixotropic agent, an alkaline hydroxide, a pigment, and water. The pigment is not necessary unless coloring is desired. The composition includes ingredients in the following weight percents:

| | |
|---|---|
| Film Forming Resins such as a polydicyclopentadiene | 15-35% |
| Fatty Acid such as Stearic Acid | .5-2.5 |
| Solvent for the acid such as Xylene, about | 10-15 |
| Alkaline Hydroxide such as Ammonium Hydroxide | 0.1-1 |
| Non-ionic Surfactant, about | .5-2.5 |
| Thixatropic Agent, about | 0.1-1 |
| Water, about | 50-60 |

If the pigment is used its range is about 1.5-3.5.

BRIEF DESCRIPTION OF THE DRAWING

FIG. 1 is a graph of a comparative showing of the moisture retention properties as a function of time of the composition of the invention and a conventional solvent based composition.

DESCRIPTION OF THE PREFERRED EMBODIMENTS

A typical composition of the curing agent of the invention which was found highly effective and which was used to obtain the results upon which the graphs of FIG. 1 is based, is as follows:

TABLE 1

| Component | Part A Grams | Weight % |
|---|---|---|
| Xylene | 111 | 10.88% |
| Stearic Acid | 12 | 1.18 |
| Non-ionic Surfactant | 15 | 1.47 |
| Polydicyclopentadiene (Mol. Wt. 800) | 309 | 30.28 |
| Hydroxybutyl Methylcellulose | 2.6 | 0.25 |
| Part B | | |
| Water | 535 | 52.42 |
| Ammonium Hydroxide | 6 | 0.59 |
| Titanium Dioxide | 30 | 2.94 |
| TOTAL | 1020.6 | 100.00 |

The composition of the curing agent may vary within the following limits:

TABLE 2

| Component | Grams Weight % |
|---|---|
| Water | 50-60 |
| Polycycloolefin | 15-35 |
| Higher Fatty Acid | .5-2.5 |
| Organic Solvent for the Fatty Acid | 10-15 |
| Alkaline Hydroxide | 0.1-1 |
| Non-ionic Surfactant | .5-2.5 |
| Thixatropic Agent | 0.1-1 |

Of course, the use of pigment is optional.

The film forming resin, a polydicyclopentadiene, is the main film forming agent. Cycloolefins in general may be used, particularly those having from 3–10 carbon atoms in the alkyl chain, and their polymers. A suitable resin is a polydicyclopentadiene sold by Hercules, Inc. of Wilmington, Delaware under the trade name of "PICCODIENE". This resin has a softening point of 103°C, a specific gravity at 25°C of 1.10, a bromine number of 39, an iodine number of 142, a flash point of 490°F, a fire point of 525°F, an acid number of 1.0, a saponification number of 2.0, and melt viscosities at 1, 10 and 100 poises of 213, 170 and 142, respectively. Another suitable polydicyclopentadiene is one having a molecular weight of about 800. Polymers of this compound within a molecular weight range of about 650–950 are suitable. The polymer is prepared from streams obtained from thermocracking of Natural Gas or low boiling liquid petroleum fractions. The streams contain mono, di, and polycylic olefins and diolefins. Present also are dicyclopentadiene and one or more of the following: indine, stryene and various derivatives of these, as well as dicycloheptene, cyclohexadiene, cycloheptene, isoprene, teprylene. Other ingredients found to be present are benzene, toluene, xylene and higher aromatics. This resin is diluted to approximately 75-78% solids with mineral spirits.

Stearic acid is the main emulsifying agent. Other higher fatty acids may be used, such as those having from 10-20 carbon atoms in the alkyl chain.

Xylene is used as a solvent for the stearic acid and the resin phase. Other alkyl substituted benzene solvents in general can be used, such as toluene and others so long as they solvate the resin base and the fatty acid. Mineral spirits may also be used but the cure is not quite as effective.

Other alkaline hydroxides than ammonia, may be used, such as, the alkali metal hydroxides. The ammonia reacts with the stearic acid to form ammonium stearate which also serves to emulsify.

The non-ionic surfactant is not entirely critical to the composition and non-ionic surfactants in general can be used with some degree of operativeness. It provides a slight emulsifying function as well as a water clean-up function. Examples of non-ionic surfactants which may be used are polyoxyethylene derivatives, polyalkyleneglygol-alkylene oxide polymers, such as, polypropyleneglycol-ethylene oxide polymers having molecular weights between about 2000–8000. The polypropylene-glycol-ethylene oxide polymer is sold under the trade name of "PLURONICS L64". A suitable non-ionic surfactant is that sold by the Nopco Chemical Division of Diamond Shamrock Chemical Company under the trade name of "NOPCO COLOR-SPERSE 188-A SURFACTANT". It is a polyoxyethylene derivative. It is a clear amber liquid which forms an emulsion in water, is readily soluble in most aromatic and aliphatic solvents used in paints and adhesives, has a density of 8.3 lb/gal., a pH (1% solution) of 6.5 and a viscosity of 110 Brookfield.

The preferred thixotropic agent is hydroxybutyl methocellulose sold under the trade name of "METHOCEL HB". Examples of other thixotropic agents which may be used are hydroxyalkyl alkylcellulose compounds, particularly, those in which the number of carbon atoms in the alkyl chains vary from 1 to 10. The thixotropic agent is a thickening agent for the system. The "METHOCEL HB" compound has the ability to solubilize in both the organic and water phases. It aids in film forming and emulsion stability. It also aids in pigment suspension.

The ingredients and their amounts, subject to the exceptions noted above, as well as the method of compounding them are critical for providing a composition with the right properties for a curing agent. The components of the composition must be compounded in a manner to provide a final product which is a water base emulsion. The following is a description of the method of compounding the ingredients to produce a composition having the required properties.

Xylene is added to a mixing kettle which is capable of being heated to 80°F and which preferably has a non-vortexing and non-airentraining agitator. The stearic acid is then added and the mixture heated to 80°F. The stearic acid will completely dissolve in xylene at this temperature. The non-ionic surfactant is then added followed by the addition of the film forming resin. The thixotropic agent is then added. Addition of each component is followed by stirring. This completes the formation of Part A.

To make Part B, water is first added to a kettle preferably equipped with a non-vortexing agitator. The ammonia is then added with stirring. This completes Part B. If pigment is used it may be added to the ammonia-water mix or it may be added to the mixture of A and B followed by milling.

The next step is highly important for producing a water base emulsion. Part A is pumped into Part B with continuous agitation at a rate slow enough to provide for good emulsification which can be detected by conventional procedures. Preferable Part A is heated to 120°F to aid pumping. After adequate stirring, the compounding of the final composition may be completed by milling if necessary. Standard tests showed the final composition was a true water based emulsion.

Comparative tests following the ASTM Standard Test Method C-309 were made for a comparison of the properties of the composition of the present invention designated "LJ-13" and two typical commercial solvent based curing compositions designated as "Cure A" and "Cure B". The results of the tests are recorded in the following Table 3.

TABLE 3

|  | LJ-13 | Cure"A" | Cure"B" | ASTM C-903 Reg. |
|---|---|---|---|---|
| Wt./gal.,lbs. | 8.32 | 6.56 | 8.37 |  |
| % Solids | 27.3 | 15.1 | 41.3 |  |
| % Resin | 24.0 | 14.3 | 15.0 |  |
| Sprayability at 40°F. | Sprayable | Sprayable | Sprayable | Sprayable |
| Dry to touch, mins. | at 50 | at 60 | at 30 | 4 hrs. or less |
| Flash Point (TCC) | 104°F | 103°F | 104°F |  |
| Reflectance,% MgO Std. | 65 | Waived | 65 | 60 |
| Vertical Spray | Excellent | Poor | Poor | Shall not Sag |
| Moisture loss (3 day) | 0.015 g/cm$^2$ | 0.027 g/cm$^2$ | 0.034 g/cm$^2$ | under 0.055 g/cm$^2$ |
| Moisture loss (7 day) | 0.025 g/cm$^2$ | 0.060 g/cm$^2$ |  |  |

It will be seen from the results presented in the above table that the composition meets the Standard ASTM requirements and that in some respects it has improved properties over those of the two conventional solvent based agents.

Moisture retention ASTM Standard Tests were made of the composition of Table 1, referred to as the "LJ-13" resin emulsion cure and a conventional solvent-based resin cure designated at "Cure A" and the graph of FIG. 1 made in which moisture loss is plotted on the ordinant against time plotted on the abscissa. The graph shows that after one-fourth of a day the moisture loss for Cure A significantly increases over that for the LJ-13 resin of the invention and that at the end of seven days the moisture loss for the former is almost three times that of the latter, the results showing that LJ-13 composition gives a superior surface coating. The resin solvent-based cure's moisture loss is relatively linear with time, so that moisture is lost continuously through the curing period at a constant rate. However, LJ-13 exhibits a moisture loss curve rather than a straight line, the greatest loss occurring during the first day. The curve becomes asymptotic so that the rate of moisture is more constant and lower with the passage of time. It is characteristic of solvent based systems that their curing graphs like the above are roughly linear.

In addition to being a curing agent it was found that the composition of the invention prevents dusting, scaling and efflourescence of the concrete surface. The composition is unique because it is initially hydrophilic (water-loving), so that it is most compatable with freshly placed concrete. When the composition is first applied, water is the carrier solvent. This increases compatability between the cure and the damp concrete so that the cure spreads evenly upon the surface and into the small capillaries and pin holes inherent in concrete. Within a period of about five minutes the cure composition undergoes inversion which occurs when the solvents in the cure begin to evaporate. This causes the cure to become water insoluble, and begins the film forming process. At the end of the inversion stage the cure has formed a tough resin film which is water insoluble. Emulsion cures like the present composition are less of a fire hazard than solvent based systems. They also clean up easily with warm, soapy water before they are allowed to dry. Emulsion cures require less petroleum resources for production and for cleaning up after use. It was found that the cure composition of the invention requires less titanium dioxide for pigmentation than solvent based cures.

Another advantage of the emulsion based system is that the pigment particles do not settle out over a reasonable storage period. In fact, no settling was observed after a three month storage period, thus making bulk storage possible. In contrast, in solvent based systems extensive settling normally occurs within at least a period of 3–7 days requiring periodic agitation during storage. State regulations require agitation of solvent based systems before use.

In summary, the present composition is economical to produce, may be produced despite many present day raw material shortages, is less hazardous to health and the environment than solvent based cures, and affords a more compatible cure for concrete than organic solvent based systems.

The composition may be applied to fresh or green concrete by conventional methods such as by spraying, brushing or with a short-nap mohair roller. It is preferably applied in a minimum amount of about one gallon for 200 sq. ft., depending upon surface texture and specification requirements.

The composition is effective for use with fresh concrete as a curing, hardening and dustproofing agent, acting to seal the surface of the concrete from stain and erosion that result from chemical attack. The seal is resistant to acid, alkali, grease, oil, water and de-icing salts. It protects the fresh concrete against sudden rain showers, within thirty minutes after application. It minimizes hair cracking and spalling of horizontal and vertical concrete surfaces in both interior and exterior exposures. Typical applications for the composition are on concrete in garages, offices, warehouses, plants, bridge decks, highways, parking decks, airport runways and parking strips and hangars.

What is claimed is:

1. A water base emulsion for use as a film-forming agent for treating concrete before it has set comprising the following ingredients with amounts given in weight percents:
   about 50–60 percent water,
   about 15–35 percent of a polydicyclopentadiene having a molecular weight range of about 650–950,
   about 0.5–2.5 percent of a higher fatty acid, having about 10 to 20 carbon atoms in the alkyl chain
   about 10–15 percent of an organic solvent for the higher fatty acid,
   about 0.1–1 percent of an alkaline hydroxide selected from the group consisting of ammonium hydroxide and alkali metal hydroxides,
   about 0.5–2.5 percent of a nonionic surfactant, and
   about 0.1–1 percent of a thixotropic agent.

2. The composition of claim 1 in which the organic solvent is a member selected from the class consisting of an alkyl substituted benzene and mineral spirits.

3. The emulsion of claim 1 in which the higher fatty acid is stearic acid, the organic solvent is xylene, the alkaline hydroxide is ammonium hydroxide, the nonionic surfactant is a polyoxyethylene derivative having a density of 8.3 lb/gallon, a pH (1% solution) of 6.5 and a viscosity of 110 Brookfield, and the thixotropic agent is hydroxy-butyl methylcellulose.

4. The composition of claim 3 including from about 1.5–3.5 percent of a pigment.

5. The composition of claim 1 in which the non-ionic surfactant comprises a polyolefin oxide.

6. The composition of claim 4 in which the pigment is titanium dioxide.

7. A water base emulsion composition for use as a concrete curing agent comprising the following ingredients with amounts given in weight percent:
   about 30.3 percent of a film-forming resin comprising polydicyclopentadiene,
   about 1.2 percent of stearic acid,
   about 10.9 percent of xylene,
   about 0.6 percent of ammonia,
   about 1.5 percent of a non-ionic surfactant which is a polyoxyethylene derivative having a density of 8.3 lb/gallon, a pH (1% solution) of 6.5 and a viscosity of 110 Brookfield.
   about 0.20 percent of hydroxy-butyl methylcellulose
   about 2.94 percent of titanium dioxide, and
   about 52.40 percent of water.

8. A process for making a water base emulsion for treating concrete before it has set, the composition of the emulsion comprising the following ingredients in weight percents:
   about 50–60 percent water,
   about 15–35 percent of a polydicyclopentadiene having a molecular weight range of about 650–950,
   about 0.5–2.5 percent of a higher fatty acid, having about 10 to 20 carbon atoms in the alkyl chain
   about 10–15 percent of an organic solvent for the higher fatty acid,
   about 0.1–1 percent of an alkaline hydroxide selected from the group consisting of ammonium hydroxide and alkali metal hydroxides,
   about 0.5–2.5 percent of a monionic surfactant, and
   about 0.1–1 percent of a thixotropic agent, the process comprising the following steps performed in the recited order:
   a. adding the higher fatty acid to the xylene in a mixing vessel with agitation,
   b. heating the mixture of (a) to about 80°F,
   c. adding the polydicyclopentadiene to the xylenes-tearic acid mixture, d. adding the non-ionic surfactant, e. adding the thixotropic agent, and f. adding the above mixture of (a) to (e) to a water-alkaline hydroxide mix to provide a pH of about 8.5, and g. agitating and heating the mix until the water base emulsion is formed.

9. The process of claim 8 in which the higher fatty acid is stearic acid, the organic solvent is xylene, the alkaline hydroxide is ammonium hydroxide, the non-ionic surfactant is a polyoxyethylene derivative having a density of 8.3 lb/gallon, a pH (1% solution) of 6.5 and a viscosity of 110 Brookfield, and the thixotropic agent is hydroxy-butyl methylcellulose.

10. A process for making a water base emulsion curing agent for concrete comprising 30 percent polydicyclopentadiene, 1.2 percent stearic acid, 10.9 percent xylene, about 0.6 percent ammonia, about 1.5 percent of a non-ionic surfactant, about 0.20 percent of hydroxy-butyl methylcellulose and about 2.94 percent of titanium dioxide, the process comprising the following steps:

a. adding the stearic acid to the xylene in a mixing vessel with agitation, b. heating the mixture to about 80°F, c. adding the polydicyclopentadiene to the xylene stearic acid mix, d. adding the non-ionic surfactant, e. adding the hydroxy-butyl methylcellulose, f. adding the above mix to a water-ammonium hydroxide mix to provide a pH of about 8.5, and g. adding titanium dioxide pigment to the mix.

11. The process of claim 9 in which pigment is added to the mixture of A and B followed by milling.

12. The process of claim 9 in which the first mixture is added to the second mixture at a rate to provide for good emulsification.

13. A process for treating concrete before it has set to keep adequate moisture in the concrete during setting to give a high quality concrete which comprises applying to the concrete soon after it is poured a film of a water base emulsion comprising the following ingredients with amounts given in weight percents:

about 50–60 percent water, about 15–35 percent of a polydicyclopentadiene having a molecular weight range of about 650-950, about 0.5–2.5 percent of a higher fatty acid, having about 10 to 20 carbon atoms in the alkyl chain about 10–15 percent of an organic solvent for the higher fatty acid, about 0.1–1 percent of an alkaline hydroxide selected from the group consisting of ammonium hydroxide and alkali metal hydroxides, about 0.5–2.5 percent of a nonionic surfactant, and about 0.1–1 percent of a thixotropic agent.

14. The process of claim 13 in which the higher fatty acid is stearic acid, the organic solvent is xylene, the alkaline hydroxide is ammonium hydroxide, the non-ionic surfactant is a polyoxyethylene derivative having a density of 8.3 lb/gallon, a pH (1% solution) of 6.5 and a viscosity of 110 Brookfield, and the thixotropic agent is hydroxy-butyl methylcellulose.

* * * * *